(12) United States Patent
Yamazaki et al.

(10) Patent No.: US 10,571,993 B2
(45) Date of Patent: Feb. 25, 2020

(54) MICRO CONTROLLER UNIT

(71) Applicant: Sanken Electric Co., LTD., Niiza-shi, Saitama (JP)

(72) Inventors: Takanaga Yamazaki, Niiza (JP); Kazuhiro Mima, Niiza (JP)

(73) Assignee: Sanken Electric Co., LTD., Niiza-shi, Saitama (JP)

(*) Notice: Subject to any disclaimer, the term of this patent is extended or adjusted under 35 U.S.C. 154(b) by 162 days.

(21) Appl. No.: 14/663,975

(22) Filed: Mar. 20, 2015

(65) Prior Publication Data

US 2016/0274647 A1 Sep. 22, 2016

(51) Int. Cl.

| | |
|---|---|
| *G06F 1/26* | (2006.01) |
| *G06F 1/32* | (2019.01) |
| *G06F 9/30* | (2018.01) |
| *G06F 1/3234* | (2019.01) |
| *G06F 1/3296* | (2019.01) |

(52) U.S. Cl.
CPC .............. *G06F 1/3243* (2013.01); *G06F 1/26* (2013.01); *G06F 9/30* (2013.01); *G06F 1/32* (2013.01); *G06F 1/3234* (2013.01); *G06F 1/3296* (2013.01); *Y02D 10/152* (2018.01)

(58) Field of Classification Search
None
See application file for complete search history.

(56) References Cited

U.S. PATENT DOCUMENTS

| | | | | |
|---|---|---|---|---|
| 5,293,586 | A | * | 3/1994 | Yamazaki .............. G06K 15/02 345/501 |
| 8,677,105 | B2 | * | 3/2014 | Abdallah ............ G06F 9/30043 712/228 |
| 9,047,093 | B2 | * | 6/2015 | Gelinas ................. G06F 9/3004 |
| 9,524,257 | B2 | * | 12/2016 | Bradbury ............... G06F 13/24 |
| 2013/0024673 | A1 | | 1/2013 | Yamazaki |
| 2015/0207988 | A1 | * | 7/2015 | Tracey .............. H04N 5/23238 348/36 |
| 2016/0054999 | A1 | * | 2/2016 | Mima ................. G06F 9/30145 712/211 |
| 2016/0274647 | A1 | * | 9/2016 | Yamazaki ............. G06F 1/3243 |
| 2017/0046538 | A1 | * | 2/2017 | Goto ....................... G06F 21/52 |
| 2017/0126738 | A1 | * | 5/2017 | Wilkerson ............. G06F 21/52 |
| 2018/0219795 | A1 | * | 8/2018 | Cameron ............. G06F 9/3004 |

FOREIGN PATENT DOCUMENTS

JP  2013025590 A  2/2013

* cited by examiner

*Primary Examiner* — Tanh Q Nguyen
(74) *Attorney, Agent, or Firm* — Banner & Witcoff, Ltd.

(57) ABSTRACT

A microcontroller unit includes: a first arithmetic processing unit, which is able to access a data bus; a second arithmetic processing unit, which includes a processor capable of accessing the data bus, and a memory. The microcontroller unit performs a data transmitting process between peripheral circuits connected to the data bus; a first arbitration circuit, which is embedded in the second arithmetic processing unit and arbitrates access to the data bus; and a second arbitration circuit, which is embedded in the second arithmetic processing unit and arbitrates access to the memory. The memory stores arithmetic processing sequences in association with event signals transmitted from the peripheral circuits, and in response to input of the event signals, the processor executes the arithmetic processing sequences corresponding to the event signals.

14 Claims, 10 Drawing Sheets

FIG.5

| Instruction | Description | Opcode (16bit) | | | | | | | | | | | | | | | |
|---|---|---|---|---|---|---|---|---|---|---|---|---|---|---|---|---|---|
| ALU Rn, Rm | ALU Operation, Rn ← Rn op Rm (16bit) | 0 | 0 | 0 | 0 | 0 | 0 | 0 | 0 | N | M | 0 | | | | | AM |
| CMP Rn, Rm | Compare Operation, T ← Rn cmp Rm (16bit) | 0 | 0 | 0 | 0 | 0 | 0 | 0 | 0 | N | M | 1 | | | | | CM |
| EVTWAIT #EVT | Wait for Event #EVT (each thread owns 16x event-pending-flags) | 0 | 0 | 0 | 0 | 0 | 0 | 1 | 0 | 0 | 0 | | | | | | EVT |
| EVTIN #EVT | T←Event #EVT (no wait; only get specified event-pending-flags) | 0 | 0 | 0 | 0 | 0 | 0 | 1 | 0 | 0 | 1 | | | | | | EVT |
| EVTOUT #EVT | Output Event #EVT | 0 | 0 | 0 | 0 | 0 | 0 | 1 | 0 | 1 | | | | | | | EVT |
| JT @AddrM | If (T==1) PC ← {AddrM[8:1], 1'b0}, else PC ← PC+2 | 0 | 0 | 0 | 0 | 0 | 0 | 1 | 1 | 0 | | | AddrM[8:1] | | | | 0 |
| JF @AddrM | If (T==0) PC ← {AddrM[8:1], 1'b0}, else PC ← PC+2 | 0 | 0 | 0 | 0 | 0 | 0 | 1 | 1 | 0 | | | AddrM[8:1] | | | | 0 |
| JMP @AddrM | PC ← {AddrM[8:1], 1'b0} | 0 | 0 | 0 | 0 | 0 | 0 | 1 | 1 | 1 | | | AddrM[8:1] | | | | 0 |
| MOVS Rn, @AddrS | Load Rn from S@AddrS | 0 | 0 | 0 | 0 | 0 | 1 | RM | | N | 0 | | AddrS[7:0] (8bit) | | | | |
| MOVS @AddrS, Rm | Store Rm to S@Addrss | 0 | 0 | 0 | 0 | 0 | 1 | WM | | M | 1 | | AddrS[7:0] (8bit) | | | | |
| MOVM Rn, @AddrM | Load Rn from M@AddrM | 0 | 0 | 0 | 0 | 1 | 0 | RM | | N | | | AddrM[8:0] (9bit) | | | | |
| MOVM @AddrM, Rm | Store Rm to M@AddrM | 0 | 0 | 0 | 0 | 1 | 1 | WM | | M | | | AddrM[8:0] (9bit) | | | | |
| TIMWAIT #TIME | Wait for #TIME x prescaler cycles | 0 | 0 | 0 | 1 | 0 | 0 | | | | | | TIME[11:0] (12bit) | | | | |
| MOVX Rn, @(Rm+ZE(Offset)) | Load Rn from X@(Rm+ZE(Offset)) | 1 | 0 | N | N | | | RM | | | | | Offset (10bit) | | | | |
| MOVX @(Rn+ZE(Offset)), Rm | Store Rm to X@(Rn+ZE(Offset)) | 1 | 1 | N | N | | | WM | | | | | Offset (10bit) | | | | |

| Read Mode | Read Operation | RM | | Note |
|---|---|---|---|---|
| RB_SE | 8bit, Sign Extended | 0 | 0 | |
| RB_ZE | 8bit, Zero Extended | 0 | 0 | |
| RW_+1 | 16bit, Twice with Address Increment | 0 | 1 | |
| RW_+0 | 16bit, Twice on Same Address | 0 | 1 | |

| Write Mode | Write Operation | WM | | Note |
|---|---|---|---|---|
| WB_LO | 8bit, Lower Side of Operand | 0 | 0 | |
| WB_HI | 8bit, Higher Side of Operand | 0 | 0 | |
| WW_+1 | 16bit, Twice with Address Increment | 0 | 1 | |
| WW_+0 | 16bit, Twice on Same Address | 0 | 1 | |

| ALU Mode | Description | AM Code | | | |
|---|---|---|---|---|---|
| MOV | Rn ← Rm | 0 | 0 | 0 | 0 |
| ADD | {C, Rn} ← Rn + Rm (16bit) | 0 | 0 | 0 | 1 |
| ADDC | {C, Rn} ← Rn + Rm + {{15{0}}, C} (16bit) | 0 | 0 | 1 | 0 |
| SUB | {C, Rn} ← Rn - Rm (16bit) | 0 | 0 | 1 | 1 |
| SUBC | {C, Rn} ← Rn - Rm - {{15{0}}, C} (16bit) | 0 | 1 | 0 | 0 |
| INC | Rn ← Rm + 1 (16bit) | 0 | 1 | 0 | 1 |
| DEC | Rn ← Rm – 1 (16bit) | 0 | 1 | 1 | 0 |
| AND | Rn ← Rn & Rm (16bit) | 0 | 1 | 1 | 1 |
| OR | Rn ← Rn | Rm (16bit) | 1 | 0 | 0 | 0 |
| XOR | Rn ← Rn ^ Rm (16bit) | 1 | 0 | 0 | 1 |
| NOT | Rn ← ~Rm (16bit) | 1 | 0 | 1 | 0 |
| SFTL | Rn ← (Rm << 1) | 1 | 0 | 1 | 1 |
| SFTR | Rn ←(Rm >> 1) | 1 | 1 | 0 | 0 |
| SFTLC | C ← Rm[15], Rn ← (Rm << 1), Rn[0] ← C | 1 | 1 | 0 | 1 |
| SFTRC | C ← Rm[0], Rn ← (Rm >> 1), Rn[15] ← C | 1 | 1 | 1 | 0 |
| reserved | | 1 | 1 | 1 | 1 |

FIG.8

| Compare Mode | Description | CM Code | | | |
|---|---|---|---|---|---|
| EQ | T ← (Rn == Rm) | 0 | 0 | 0 | 0 |
| NE | T ← (Rn != Rm) | 0 | 0 | 0 | 1 |
| GTS | T ← (Rn > Rm), Signed | 0 | 0 | 1 | 0 |
| GES | T ← (Rn >= Rm), Signed | 0 | 0 | 1 | 1 |
| LTS | T ← (Rn < Rm), Signed | 0 | 1 | 0 | 0 |
| LES | T ← (Rn <= Rm), Signed | 0 | 1 | 0 | 1 |
| GTU | T ← (Rn > Rm), Unsigned | 0 | 1 | 1 | 0 |
| GEU | T ← (Rn >= Rm), Unsigned | 0 | 1 | 1 | 1 |
| LTU | T ← (Rn < Rm), Unsigned | 1 | 0 | 0 | 0 |
| LEU | T ← (Rn <= Rm), Unsigned | 1 | 0 | 0 | 1 |
| ZERO | T ← (Rn == 0) | 1 | 0 | 1 | 0 |
| CLRT | T ← 0 | 1 | 0 | 1 | 1 |
| SETT | T ← 1 | 1 | 1 | 0 | 0 |
| GETC | T ← C | 1 | 1 | 0 | 1 |
| PUTC | C ← T | 1 | 1 | 1 | 0 |
| CLRC | C ← 0 | 1 | 1 | 1 | 1 |

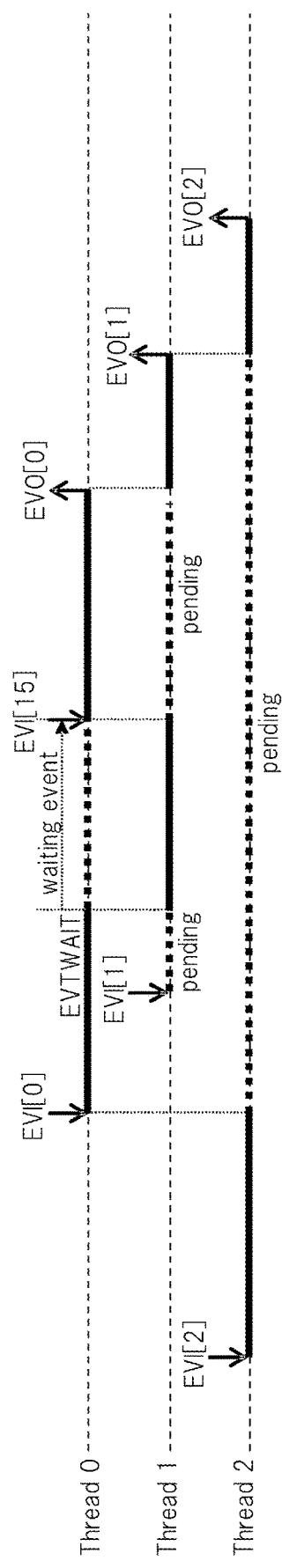
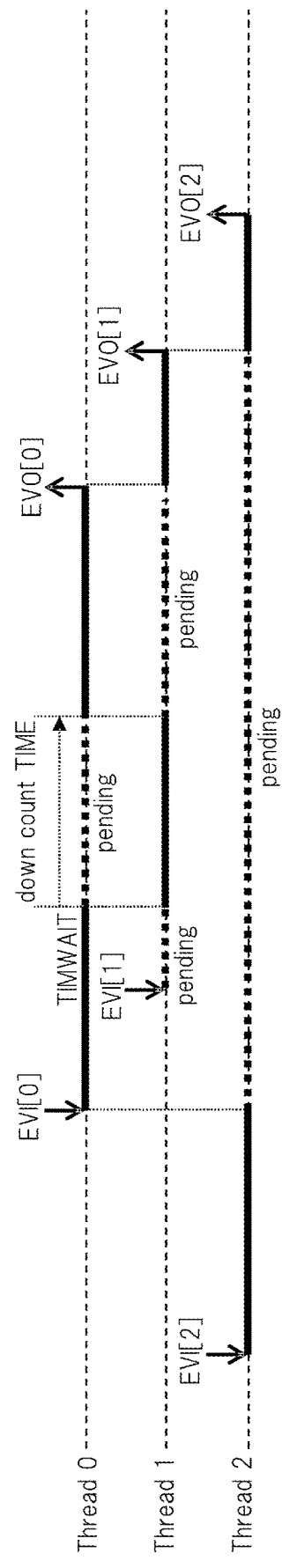

MICRO CONTROLLER UNIT

TECHNICAL FIELD

The present invention relates to a microcontroller unit for controlling a power converter.

BACKGROUND ART

In an MCU (Micro Controller Unit) for a power conversion application in which real-time properties such as full digital power-supply control and motor control are regarded as important, for example, a conversion end event from an A/D converter, an inversion detection event a comparator, and a timing event from a PWM (pulse width modulation) timer are output respectively and there is a necessary that process which should be performed in response to each event is performed without a delay time.

Hereinafter, although this technology will be disclosed especially in association with digital power-supply control, since the essence of feedback control does not change, the contents of this disclosure are applied exactly in the same way in a case where this is any other power controls including motor control.

In Japanese Patent Application Laid-Open No. 2013-25590, there has been disclosed an MCU which independently operates a DMAC (Direct Memory Access Controller) and a CPU (Central Processing Unit).

In this MCU, if an A/D converter ends conversion, the DMAC transmits data from a conversion result register of the A/D converter to a data register of a DSP (Digital Signal Processor), and starts up an arithmetic processing sequence of the DSP. If the arithmetic processing sequence of the DSP ends, the DMAC transmits the result data of the arithmetic processing sequence to a duty setting register of a PWM timer. If this series of processing is applied, for example, linear control (phase compensation using a digital filter) in a digital power supply is able to be performed without intervention of the CPU.

SUMMARY

A DSP which is embedded in a low-cost MCU for a power-supply circuit is generally specialized in performing a digital filter process and is not able to perform condition determination. In full digital power-supply control, control mode switching according to a load state is necessary in macroscopic, and off-resonance detection or the like is necessary in microscopic, and then in both cases, some kind of condition determination is necessary.

Since such condition determination process cannot be performed by only the DSP and the intervention of a CPU is needed. However, if a low-cost CPU is employed due to economic reasons, the performance of the entire system is lowered due to lowness of instruction execution performance and lowness of interrupt acknowledge performance (the length of an instruction execution state saving/restoring process).

Meanwhile, it is possible to perform instruction enhancement on a DSP such that the DSP is able to perform condition determination like a CPU. However, this causes an addition of a mechanism for accessing an internal bus in LSI (Large Scale Integration), an increase in instruction length according to instruction enhancement, an increase in the capacity of an instruction memory and the like, and thus a chip area increases.

This disclosure was made in view of the above described circumstances, and an object of this disclosure is to provide a microcontroller unit which is able to perform a condition determining process, and the like, necessary to control a power converter without intervention of a CPU and without increasing a chip area.

A microcontroller unit of this disclosure is a microcontroller unit for controlling a power converter, including: a first arithmetic processing unit, which performs a system process and is able to access a data bus; a second arithmetic processing unit, which includes a processor and a memory that are capable of accessing the data bus and performs a data transmitting process between peripheral circuits connected to the data bus; a first arbitration circuit, which is embedded in the second arithmetic processing unit and arbitrates access of the first arithmetic processing unit and the processor to the data bus; and a second arbitration circuit, which is embedded in the second arithmetic processing unit and arbitrates access of the second arithmetic processing unit and the processor to the memory, wherein the memory stores arithmetic processing sequences respectively in association with a plurality of event signals transmitted from the peripheral circuits connected to the data bus, and wherein, in response to input of any one of the plurality of event signals, the processor executes the arithmetic processing sequence corresponding to the event signal.

According to this disclosure, it is possible to provide a microcontroller unit which is able to perform a condition determining process and the like necessary to control a power converter without intervention of a first arithmetic processing unit and without increasing a chip area.

BRIEF DESCRIPTION OF DRAWINGS

FIG. 5 is a view illustrating examples of instructions which is used in arithmetic processing sequences for the EPU.

FIG. 6 is a view illustrating an example of a designation field related to loading/storing instructions of the instructions which is used in the arithmetic processing sequences for the EPU.

FIG. 7 is a view illustrating examples of designation fields related to ALU (Arithmetic Logic Unit) (which is a peripheral circuit) instructions of the instructions which is used in the arithmetic processing sequence for the EPU.

FIG. 8 is a view illustrating examples of designation fields related to comparator CMP (which is a peripheral circuit) instructions of the instructions which is used in the arithmetic processing sequence for the EPU.

FIG. 9 is a timing chart for explaining an operation in a case where a processor 21 performs an arithmetic processing sequence including an event waiting instruction.

FIG. 10 is a timing chart for explaining an operation in a case where the processor 21 performs an arithmetic processing sequence including a timer instruction.

DESCRIPTION OF EXEMPLARY EMBODIMENT

Hereinafter, an embodiment will be described with reference to drawings.

Figure 1:
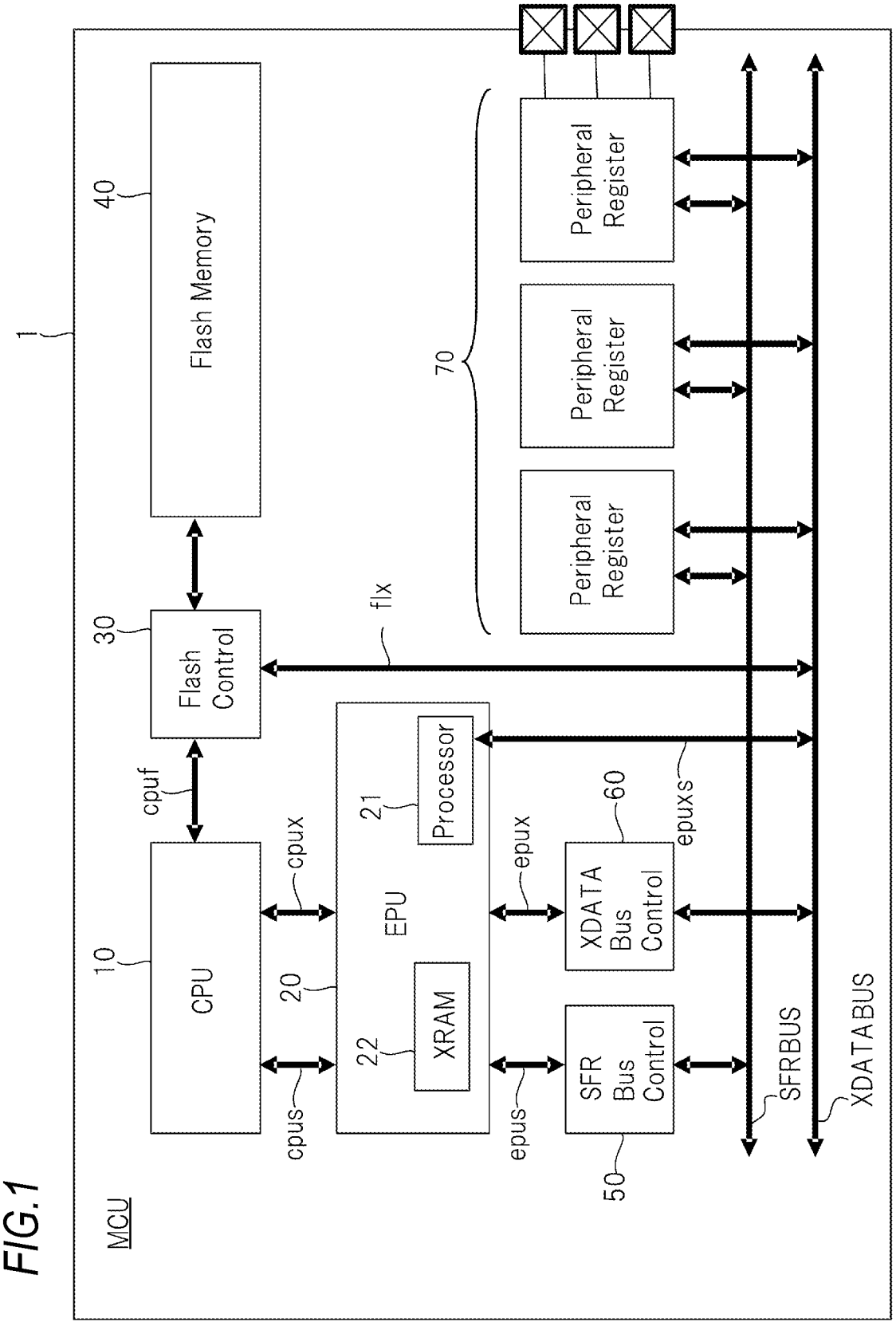
FIG. 1 is a view illustrating a configuration of a microcontroller unit (MCU) 1 which is an embodiment of the present invention and is for control on a power-supply circuit.

FIG. 1 is a view illustrating a configuration of a microcontroller unit (MCU) 1 which is an embodiment of the present invention and is for controlling a power-supply circuit.

The MCU 1 includes a CPU 10 which is a first arithmetic processing unit, an EPU (Event Processing Unit) 20 which includes an XRAM (Xtention Random Access Memory) 22 serving as a memory and a processor 21 to be described below, a flash memory 40 which serves as a non-volatile memory, a flash controller 30 which performs data read control of the flash memory 40, a bus controller 50, a bus controller 60, registers 70 (in the example of FIG. 1, three registers are shown) which are used in processes in peripheral circuits such as an A/D converter, a comparator, a DSP, and a PWM timer necessary to control the power-supply circuit, an XDATA (Xtention DATA) BUS which serves as a data bus, and an SFR (Special Function register) BUS which serves as a data bus. Here, the number of data buses is two. However, the number of data buses may be one.

The CPU 10 is able to access the data buses (the SFR BUS and the XDATA BUS), and performs a system process of the entire MCU 1. The EPU 20 is able to access the data buses (the SFR BUS and the XDATA BUS) like the CPU 10, and performs a data transmitting process between peripheral circuits connected to the data buses.

The SFR BUS is connected to the bus controller 50 and the registers 70 of peripheral circuits.

The XDATA BUS is connected to the bus controller 60, the registers 70 of the peripheral circuits, the processor 21 included in the EPU 20, and the flash controller 30.

In FIG. 1, a bus connecting the XDATA BUS with the flash controller 30 is shown as a bus flx, and a bus connecting the XDATA BUS with the processor 21 of the EPU 20 is shown as a bus epuxs.

The CPU 10 is connected to a bus cpus for connecting with the bus controller 50, a bus cpux for connecting with the bus controller 60, and a bus cpuf for connecting with the flash controller 30. An example of the CPU 10 is the 8051 architecture.

The flash memory 40 stores an arithmetic processing sequence (program) of the CPU 10, and various data which is referred to by this program. The CPU 10 reads the program stored in the flash memory 40 via the flash controller 30, and executes the program, and reads various data necessary in the program, from the flash memory 40, and uses the data.

The EPU 20 is connected to a bus epus for accessing the bus controller 50, and the bus epux for accessing the bus controller 60.

Figure 2:
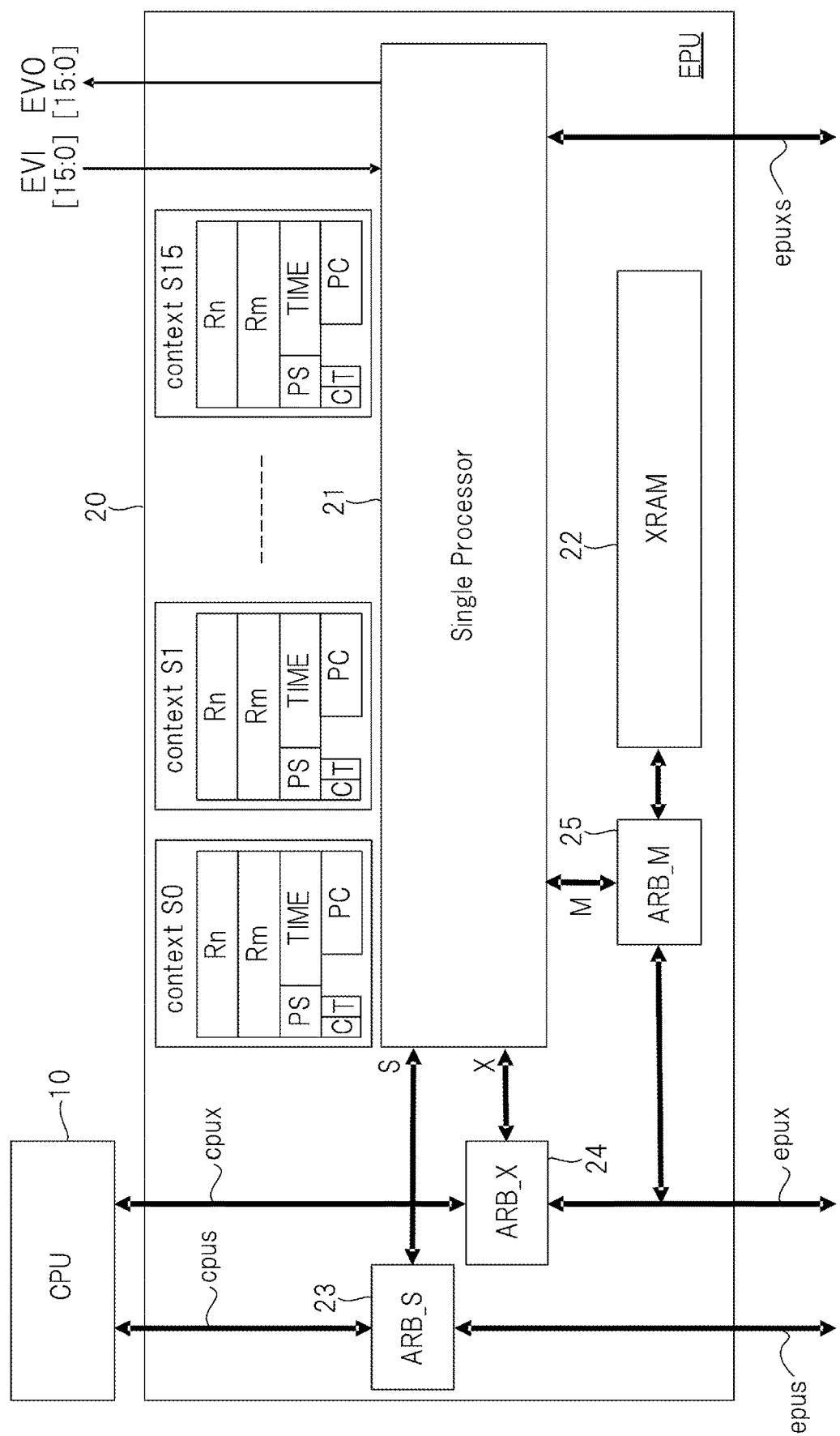
FIG. 2 is a view illustrating a detailed configuration of the inside of an EPU 20 of the MCU 1 shown in FIG. 1.

FIG. 2 is a view illustrating a detailed configuration of the inside of the EPU 20 of the MCU 1 shown in FIG. 1.

The EPU 20 includes the processor 21, an XRAM 22, 16 context holding units S0 to S15, and arbitration circuits 23, 24, and 25.

The arbitration circuit 23 is connected between the bus cpus and the bus epus. The arbitration circuit 23 is also connected to the processor 21 by an internal bus S.

The CPU 10 is able to access the SFR BUS via the bus cpus, the arbitration circuit 23, and the bus epus. Also, the processor 21 is able to access the SFR BUS via the internal bus S, the arbitration circuit 23, and the bus epus.

The arbitration circuit 23 gives priorities to the access right of the CPU 10 to the SFR BUS and the access right of the processor 21 to the SFR BUS, and arbitrates access of the CPU 10 and the processor 21 to the SFR BUS such that the processor 21 is able to access the SFR BUS prior to the CPU 10.

The arbitration circuit 24 is connected between the bus cpux and the bus epuxs. The arbitration circuit 24 is also connected to the processor 21 by an internal bus X.

The CPU 10 is able to access the XDATA BUS via the bus cpux, the arbitration circuit 24, and the bus epuxs. Also, the processor 21 is able to access the XDATA BUS via the internal bus X, the arbitration circuit 24, and the bus epux.

The arbitration circuit 24 gives priorities to the access right of the CPU 10 to the XDATA BUS and the access right of the processor 21 to the XDATA BUS, and arbitrates access of the CPU 10 and the processor 21 to the XDATA BUS such that the processor 21 is able to access the XDATA BUS prior to the CPU 10. The arbitration circuit 23 and the arbitration circuit 24 configure a first arbitration circuit.

The arbitration circuit 25 is connected between the bus epuxs and the XRAM 22. The arbitration circuit 25 is also connected to the processor 21 by an internal bus M.

The CPU 10 is able to access the XRAM 22 via the bus cpux, the arbitration circuit 24, the bus epux, and the arbitration circuit 25. Also, the processor 21 is able to access the XRAM 22 via the internal bus M and the arbitration circuit 25.

The arbitration circuit 25 gives priorities to the access right of the CPU 10 to the XRAM 22 and the access right of the processor 21 to the XRAM 22, and arbitrates access of the CPU 10 and the processor 21 to the XRAM 22 such that the processor 21 is able to access the XRAM 22 prior to the CPU 10. The arbitration circuit 25 constitutes a second arbitration circuit.

16 event signals (EVI[0] to EVI[15]) is input to the processor 21. Although not shown, any one is selected from a plurality of event signals which are generated as data transmission request signals from a plurality of the peripheral devices included in the MCU 1 and is input to a terminal to which the event signals EVI[0] to EVI[15] is respectively input. A selector circuit for that is provided outside the EPU 20.

The XRAM 22 stores arithmetic processing sequences for the EPU, which is composed of instruction strings being able to be decoded by the processor 21, and data for the EPU, which is referred by the arithmetic processing sequences for the EPU. The XRAM 22 stores arithmetic processing sequences for the EPU, which respectively corresponds to the 16 event signals input to the processor 21. The arithmetic processing sequences for the EPU, which respectively corresponds to the 16 event signals, are stored from start addresses, which respectively corresponds to the arithmetic processing sequences in the XRAM 22. Also, a process flow based on an arithmetic processing sequence, which is executed by the processor 21 corresponding to any one event signal, is referred to as a thread.

As described above, the XRAM 22 is able to be accessed from also the CPU 10. In the MCU 1, the CPU 10 uses the XRAM 22 as a work memory (an area for temporarily storing data to be referred to by the programs stored in the flash memory 40).

The context holding units S0 to S15 are provided with corresponding to the 16 arithmetic processing sequences which are stored in the XRAM 22.

A context is information (such as the value of a program counter, the value of a condition flag, the value of a timer, and the contents of a data storing register) necessary to execute an arithmetic processing sequence. Each of the context holding units S0 to S15 is a hardware resource (specifically, a register which is configured by a flip-flop) for storing a kind of information necessary to execute an arithmetic processing sequence corresponding to each of context holding unit.

The configurations of the context holding units S0 to S15 include programmer's models of general CPUs. In the example shown in FIG. 2, each of the context holding units S0 to S15 configures two general-purpose registers Rn and Rm (a length of 16 bits) for storing data, a program counter PC (a length of 9 bits), a carry flag C (1 bit), a condition flag T (1 bit), a timer down-counter TIME (a length of 12 bits), and a prescaler PS for a timer (a length of 4 bits).

As described, the context holding units S0 to S15 hold contexts by hardware, not on the XRAM 22 of the EPU 20. If the contexts are put on the XRAM 22, context switching according to a transition between different threads takes time to perform read or write via buses and consumes a large amount of power. Meanwhile, if the contexts are held by hardware, there are merits such as context switching becomes possible in zero time and power consumption decreases.

The processor 21 assigns priorities to the arithmetic processing sequences, which respectively correspond to the 16 event signals, and preferentially executes an arithmetic processing sequence with a higher priority according to the priorities.

As a method of assigning priorities to the arithmetic processing sequences, there are the following first to third methods. However, the assigning method is not limited thereto.

The first method is a method of assigning a higher priority to a corresponding arithmetic processing sequence as an event signal having a smaller number.

Figure 3:
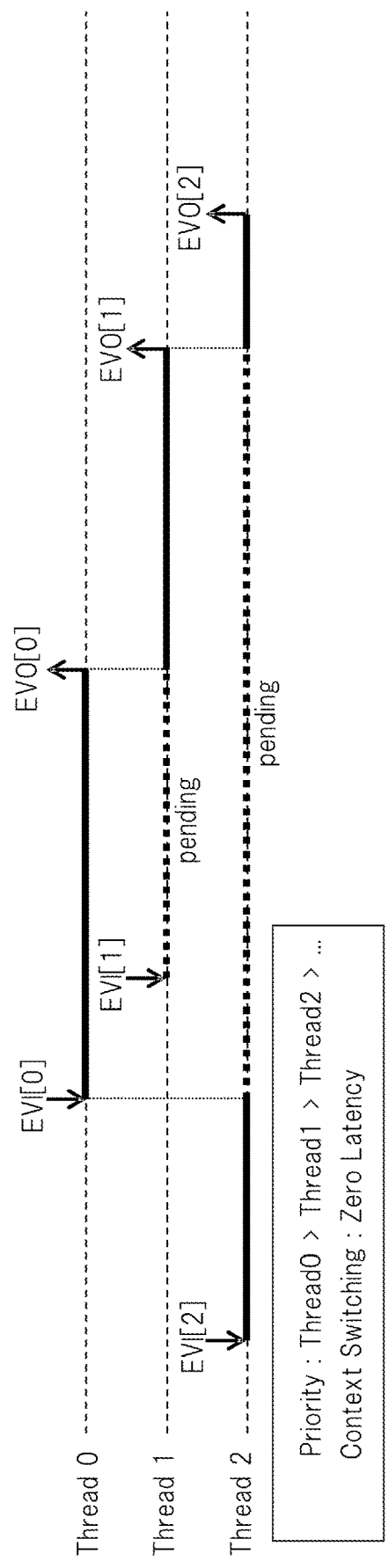
FIG. 3 is a view for explaining an example of a priority assigning method of an arithmetic processing sequence.

FIG. 3 is a view for explaining an example of the method of assigning priorities to the arithmetic processing sequences. In FIG. 3, a thread n (n is any one of 0 to 15) is based on an arithmetic processing sequence corresponding to an event signal EVI[n], and a higher priority is set as a number n which is smaller. In FIG. 3, it is assumed, at first, that every thread is being stopped in an event waiting state.

In the example of FIG. 3, if the event signal EVI[2] is input, the processor 21 starts a thread 2 based on an arithmetic processing sequence corresponding to the event signal EVI[2]. Thereafter, if the event signal EVI[0] is input, the processor 21 temporarily stops the thread 2 and starts a thread 0 based on an arithmetic processing sequence corresponding to the event signal EVI[0].

Even if the event signal EVI[1] is input in the process of the thread 0, the processor 21 does not execute an arithmetic processing sequence corresponding to the event signal EVI [1]. Further, according an instruction being executed immediately before stop of the thread 0, the processor 21 outputs an event output signal EVO[0], and then, when the thread 0 becomes an event input waiting state and is stopped, the processor starts a thread 1 having the next highest priority. Furthermore, according an instruction being executed immediately before stop of the thread 1, the processor 21 outputs an event output signal EVO[1], and then, when the thread 1 becomes an event input waiting state and is stopped, the processor restarts the stopped thread 2.

The second method is a method of assigning priorities in a round-robin policy. This is a method where, a priority with respect to an arithmetic processing sequence whose execution has stopped is set to be lowest after the stop time, whereby priorities are circulated to the arithmetic processing sequences. Alternatively, it may be a method where priorities are circulated in the round-robin policy not only when the execution stops but also when one instruction is executed.

The third method is a combination of the first method and the second method, and makes it possible to select arithmetic processing sequences in which priorities are fixed and arithmetic processing sequences for which priorities are circulated in a round-robin policy, and makes it possible to select priorities of a group of the arithmetic processing sequences in which priorities are fixed and a group of the arithmetic processing sequences in which priorities are circulated in a round-robin policy, in a fixing manner or an alternate manner.

For example, if an event signal is input to the EPU 20, a thread corresponding to that event signal is started. In a case where a plurality of event signals is input at the same time, a thread having the highest priority is started. Also, for example, if an event signal corresponding to a thread S0 with a priority higher than that of a thread S1 is input in the process of the thread S1, the thread S1 stops and a context for the thread S1 is held as it is, and then program execution starts using a context corresponding to the thread S0. Since contexts corresponding to the individual threads are held by hardware, a process for saving/restoring into a memory or the like is unnecessary, and high-speed switching is possible.

Figure 4:
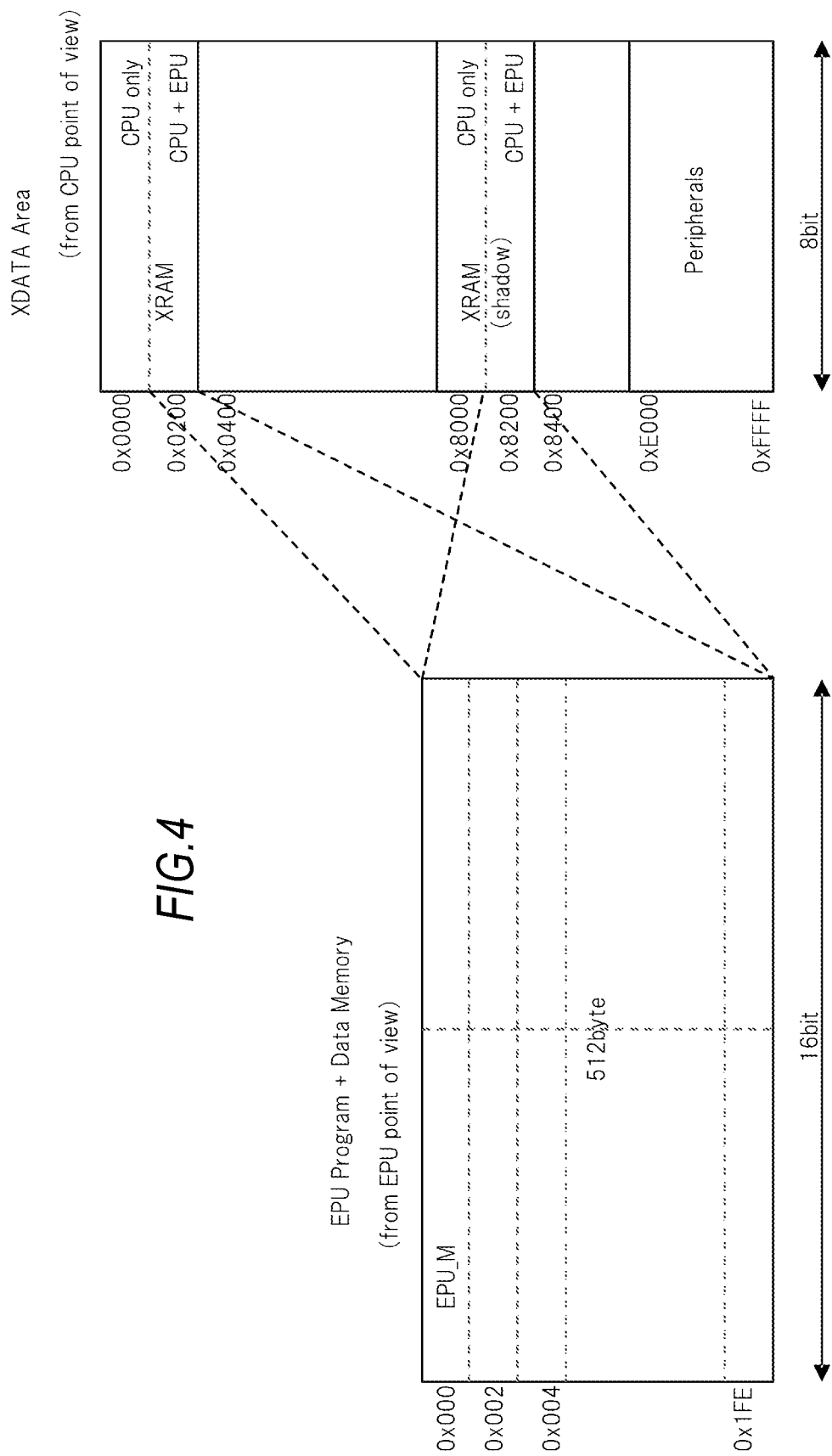
FIG. 4 is a memory map as a memory area embedded in the MCU 1 is seen from a CPU 10 and the EPU 20.

FIG. 4 is a memory map as a memory area embedded in the MCU 1 is seen from the CPU 10 and the EPU 20. A part of the XRAM 22 included in the memory area is an area EPU_M (the left block in the drawing) where data is able to be read and written by each of the CPU 10 and the EPU 20, and the other of the XRAM 22 is an area where data is able to be read and written only by the CPU 10.

In the example of FIG. 4, the capacity of the area EPU_M of the XRAM 22 is 512 bytes. Since the address space of the area EPU_M is as small as 512 bytes, it is directly indicated by a 9-bit address. Therefore, the program counter PC of each of the context holding units S0 to S15 needs only a width of 9 bits.

In this disclosure, since it is assumed that each instruction length of the arithmetic processing sequences for the EPU is fixed to a width of 16 bits and the arithmetic processing sequences are always disposed from an even address, the least significant bit of the program counter PC is fixed to 0. By giving an initial value to the program counter PC, it is possible to dispose each arithmetic processing sequence at an arbitrary position.

In the example of FIG. 4, an area of the XRAM 22 which is can be used by the CPU 10 is 1 KB, and a half of that area is set for the area EPU_M. Therefore, since it becomes unnecessary to include a plurality of RAM macros with large area overheads in the MCU 1, it is possible to prevent an increase in the area of the MCU 1. Also, it is able to perform initialization of data of the area EPU_M from the CPU 10.

(XRAM Initialization)

The arithmetic processing sequences for the EPU and the data for the EPU are stored in the flash memory 40 in advance. At start-up of the MCU 1, the CPU 10 reads the arithmetic processing sequences for the EPU and the data for the EPU from the flash memory 40 and writes them in the XRAM 22, thereby performing a process of initializing the arithmetic processing sequences for the EPU and the data for the EPU stored in the XRAM 22.

(Context Initialization)

In the MCU 1, since the processor 21 is connected to the XDATA BUS via the bus epus, the CPU 10 accesses the processor 21 via the XDATA BUS and the bus epuxs and performs a process of initializing the contents of the context holding units S0 to S15.

(Start-Up of EPU 20 by CPU 10)

In an initial state at start-up of the MCU 1, every thread is being stopped, and the processor 21 becomes a state where reception of the threads based on arithmetic processing sequences and the event signals is being stopped. In order to release this state, at start-up of the MCU 1, the CPU 10 accesses the processor 21 via the XDATA BUS and the bus epuxs and performs control such that the processor 21 starts execution of a necessary arithmetic processing sequence of the 16 sequences and becomes an input waiting state for an event signal corresponding to each arithmetic processing sequence. As a result, the individual threads are activated for the moment, but the individual threads become the event input waiting state in turn according to instructions included in the arithmetic processing sequences of the individual threads, and a normal operation, in which each thread is started by input of an event signal, is performed.

In the above described configuration, even if the processor becomes the waiting state for inputting the event signal, if input of an event signal is not actually performed, any thread is not started. For this reason, for example, a register for self start-up is embedded in the processor 21. Since individual bits of this register correspond respectively to the 16 event signals and a specific bit is set, it is possible to forcibly generate an event signal corresponding to this bit.

The CPU 10 sets an arbitrary bit of this register via the bus epuxs, thereby simulatively generating an event signal and inputting the event signal to the processor 21. Therefore, even if input of an event signal by hardware is performed, it is possible to activate a thread by software.

The processor 21 also is able to access the above described register via the bus epuxs. Therefore, the processor 21 may simulatively generate event signals for different arithmetic processing sequences by setting arbitrary bits of this register.

Next, specific examples of individual instructions of the arithmetic processing sequences for the EPU stored in the XRAM 22 will be described. The arithmetic processing sequences for the EPU have a fixed length of 16 bits as shown in FIGS. 5 to 8, and have a loading/storing type architecture like an RISC (Reduced Instruction Set Architecture).

FIG. 5 is a view illustrating examples of instructions which is used in the arithmetic processing sequences for the EPU. FIG. 6 is a view illustrating an example of a designation field related to loading/storing instructions of the instructions which is used in the arithmetic processing sequences for the EPU. FIG. 7 and FIG. 8 are views illustrating examples of an ALU (Arithmetic Logic Unit) mode (AM) of numeric-operation-related instructions and a designation field of a compare mode (CM) of numeric-comparison-related instructions, of the instructions which is used in the arithmetic processing sequences for the EPU.

In FIG. 5, an event waiting instruction which is denoted by "EVTWAIT # EVT" is an instruction for stopping a thread being executed until an event signal designated by an EVT field is input.

FIG. 9 is a timing chart for explaining an operation in a case where the processor 21 performs an arithmetic processing sequence including the event waiting instruction. In FIG. 9, the thread 0 is a thread based on the arithmetic processing sequence including the event waiting instruction. Also, each arithmetic processing sequence has a higher priority as the number of a corresponding event signal becomes smaller. In FIG. 9, it is assumed that, at first, threads based on all arithmetic processing sequences are at a stop in the event waiting state.

If the event signal EVI[2] is input, the processor 21 starts the thread 2 based on the arithmetic processing sequence corresponding to the event signal EVI[2]. Thereafter, if the event signal EVI[0] is input, the processor 21 temporarily stops the thread 2 and starts the thread 0 based on the arithmetic processing sequence corresponding to the event signal EVI[0].

The event signal EVI[1] is input in the process of the thread 0. However, the priority of the arithmetic processing sequence corresponding to the event signal EVI[1] is lower than the arithmetic processing sequence corresponding to the event signal EVI[0]. Therefore, the processor 21 does not execute the arithmetic processing sequence corresponding to the event signal EVI[1].

After the event signal EVI[1] is input, if the processor 21 executes the event waiting instruction (here, an instruction for waiting for input of the event signal EVI[15]) in the process of the thread 0, the processor 21 stops the thread 0 and starts the thread 1 having the next highest priority.

Then, after the start of the thread 1, if the event signal EVI[15] is input, the processor 21 stops the thread 1 and restarts thread 0. According an instruction being executed immediately before end of the thread 0, the processor 21 outputs the event output signal EVO[0], and then, when the thread 0 becomes the event input waiting state and is stopped, the processor starts the thread 1 having the next highest priority. Then, according to the instruction being executed immediately before end of the thread 1, the processor 21 outputs the event output signal EVO[1], and then, when the thread 1 becomes the event input waiting state and is stopped, the processor restarts the stopped thread 2.

Also, in this disclosure example, an event signal, which is received by the event waiting instruction, is selected from the event input signals EVI for thread start-up. Alternatively, an event signal received by the event waiting instruction may be selected from signals, which is totally different from the EVI signals for activating the individual threads and is existing in the MCU 1.

This event waiting instruction is used in a case where it is desired to perform a process using a plurality of A/D conversion results.

In FIG. 5, an instruction which is denoted by "TIMWAIT # TIME" is an instruction for stopping a thread based on an arithmetic processing sequence being executed and restarting this thread if a predetermined time designated by a TIME field elapses from the stop of this thread.

FIG. 10 is a timing chart for explaining an operation in a case where the processor 21 performs an arithmetic processing sequence including a timer instruction. In FIG. 10, the thread 0 is a thread based on the arithmetic processing sequence including the timer instruction. Also, each arithmetic processing sequence has a higher priority as the number of a corresponding event signal becomes smaller. In FIG. 10, it is assumed that, at first, every thread is being stopped in the event waiting state.

If the event signal EVI[2] is input, the processor 21 starts the thread 2 based on the arithmetic processing sequence corresponding to the event signal EVI[2]. Thereafter, if the event signal EVI[0] is input, the processor 21 temporarily stops the thread 2 and starts the thread 0 based on the arithmetic processing sequence corresponding to the event signal EVI[0].

The event signal EVI[1] is input in the process of the thread 0. However, the priority of the arithmetic processing sequence corresponding to the event signal EVI[1] is lower than the arithmetic processing sequence corresponding to the event signal EVI[0]. Therefore, the processor 21 does not execute the arithmetic processing sequence corresponding to the event signal EVI[1].

After the event signal EVI[1] is input, if the processor 21 executes the timer instruction in the process of the thread 0, the processor 21 stops the thread 0 and starts the thread 1 having the next highest priority. Simultaneously, the processor 21 loads the time designated by an instruction field TIME in a timer counter TIME of a context S0. Then, the counter TIME is decremented by a clock which the prescaler PS initialized in advance generates.

If the counter TIME becomes zero, the processor 21 stops the thread 1 and restarts the thread 0. According to the direction of the instruction being executed immediately before end of the thread 0, the processor 21 outputs the event output signal EVO[0], and then, when the thread 0 becomes the event input waiting state and is stopped, the processor 21 restarts the thread 1 having the next highest priority. Then, according to the direction of the instruction being executed immediately before stop of the thread 1, the processor 21 outputs the event output signal EVO[1], and the processor restarts the stopped thread 2 after stopping of the thread 1.

According to this timer instruction, in the process of execution of a sequence having a margin in the processing time, it is possible to execute another sequence. Therefore, it is possible to efficiently execute a plurality of threads.

In FIG. 5, an event state input instruction which is denoted by "EVTIN # EVT" is an instruction for changing a register value of the condition flag T which is used in an arithmetic processing sequence being executed if a designated event signal is input. According to this instruction, condition branching is possible by event signals which are input from the outside. Therefore, it is possible to implement a process including complicated determination.

In FIG. 5, an event state input instruction which is denoted by "EVTOUT # EVT" is an instruction for outputting an arbitrary event output signal EVO[n] designated by the EVT field of the instruction toward a peripheral circuit. According to this instruction, it becomes possible with using event end signals to perform A/D converter activation, timer synchronization, PWM timer synchronization, and the like.

Access to the SFR BUS is performed by an MOVS instruction of FIG. 5. Since the address space of the SFR BUS is set to 8 bits, an access destination address is directly designated by an instruction field.

Access to the XDATA BUS is performed by an MOVX instruction of FIG. 5. Since the address space of the XDATA BUS is set to 16 bits, an access destination address is obtained by adding OFFSET in an instruction field to general-purpose registers Rn and Rm of a hardware context.

Access to the area EPU_M of the XRAM 22 is performed by an MOVM instruction of FIG. 5. Since the address space of the area EPU_M is set to 9 bits, an access destination address is directly designated by an instruction field.

Figure 11:
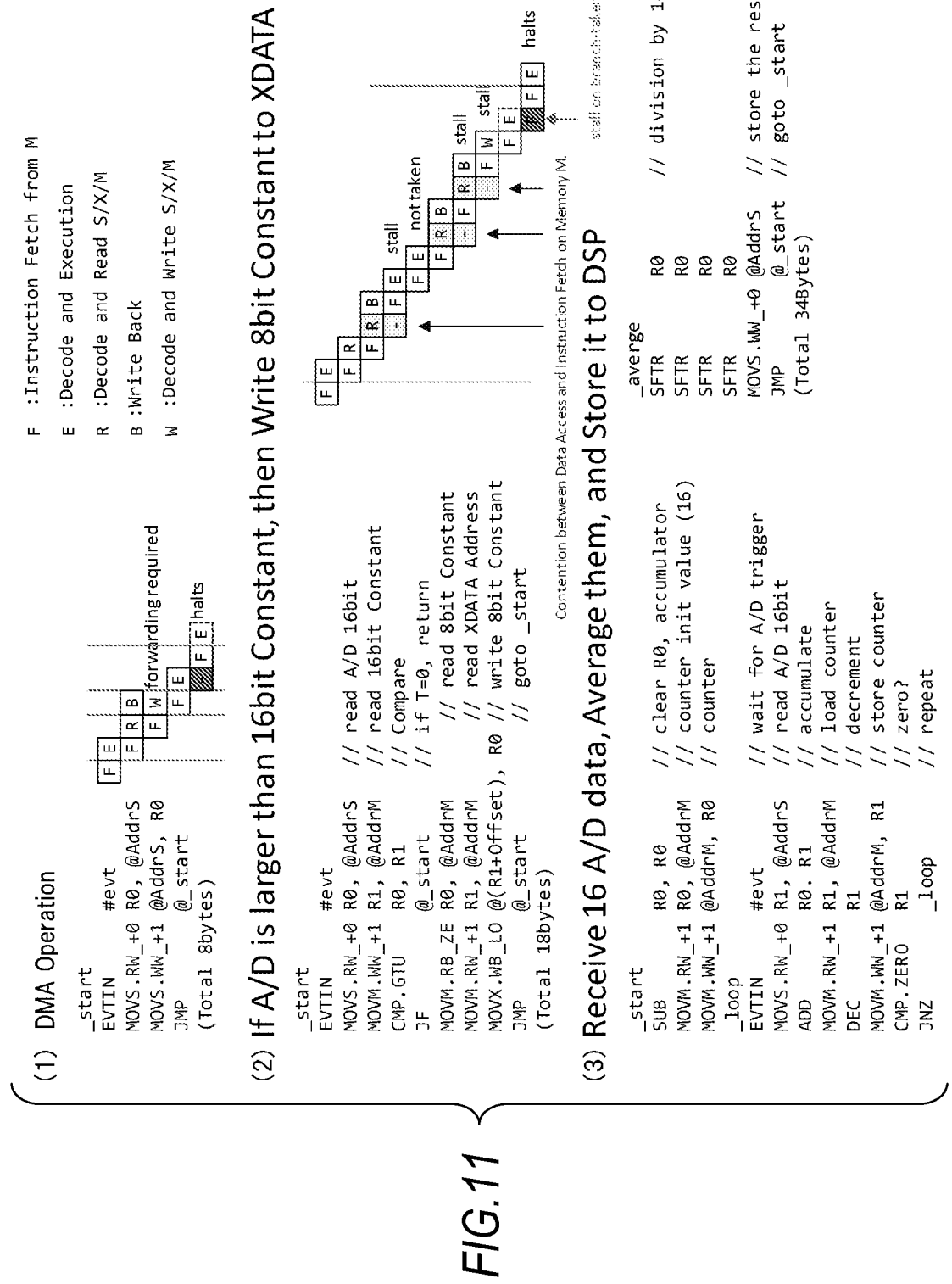
FIG. 11 is a view illustrating a specific example of the arithmetic processing sequence for the EPU.

FIG. 11 shows specific examples of arithmetic processing sequences (1) to (3).

The example of (1) shows an operation of performing simple data transmission without intervention of the CPU 10, like a general DMAC.

The example of (2) shows an operation of writing a value in an arbitrary register of a peripheral circuit on the XDATA BUS in a case where an A/D conversion result is larger than a predetermined value in a thread activated by an A/D conversion end event. This example can be used in a process such as a process for switching between PWM operations according to the A/D conversion results.

The example of (3) shows an operation of capturing the A/D conversion result 16 times, calculating the average value of them, and writing the average value in a peripheral circuit (such as a DSP).

According to the above description, in order to start various threads by the EPU 20, the CPU 10 initializes data of the area EPU_M of the XRAM 22 or initializes the context holding units S0 to S15. As a modification of this, at start-up of the MCU 1, the processor 21 of the EPU 20 may initialize data of the area EPU_M of the XRAM 22 or initialize the context holding units S0 to S15. Hereinafter, this modification will be described.

In order to activate the MCU 1 for a power-supply circuit, an auxiliary power source for generating a low voltage with which the MCU 1 is able to operate from a high input voltage is needed. Since the auxiliary power source generates the low voltage from the high voltage at start-up of the MCU 1, if current consumption at start-up of the MCU 1 is large, power consumed by the auxiliary power source increases and thus it becomes difficult to make up the auxiliary power source.

Therefore, it is desired to make current consumption at start-up of the MCU 1 as small as possible. However, if the MCU 1 is started and the CPU 10 operates to continuously access of the flash memory 40 starts, power consumption increases. Meanwhile, if the MCU 1 is started and starts a control operation as a digital power supply, power for the MCU 1 is able to be received from a voltage which a digital power-supply system being under control of the MCU 1 generates.

In a period from when the MCU 1 is started to when the MCU 1 starts to operate as a digital power supply, very highly precise digital power-supply control is unnecessary, and therefore it is sufficient to perform control such that a power voltage necessary for the MCU 1 is obtained. That is, in this period, it is only needed that it is possible to perform a digital power supply operation according to simple feedback control.

Therefore, the DSP may be activated from the A/D converter via the EPU 20, and a thread (for example, the thread 0) for transferring a duty value to PWM via the EPU 20 at the end of DSP calculation may be simplified and be performed without intervention of the CPU 10. If the EPU 20 initiatively performs this simplified thread 0, the operation becomes possible without consuming the power of the CPU 10 and the flash memory 40, that is, only by the auxiliary power source.

The operation of the modification will be described specifically.

If the MCU 1 is started by the auxiliary power source, the processor 21 of the EPU 20 accesses the flash memory 40 (which may be a MASK ROM provided inside the MCU 1 or a ROM configured by logic elements) from the bus epuxs via the XDATA BUS, and acquires the arithmetic processing sequences for the EPU and various data necessary in the arithmetic processing sequences for the EPU from the flash memory 40, and writes them in the XRAM 22.

Next, a thread (here, the thread 0) based on one arithmetic processing sequence of them written in the XRAM 22 is started. The sequence from the start-up of the MCU 1 to this moment is automatically processed by hardware included in the EPU 20. The processor 21 starts execution of an arithmetic processing sequence for the EPU corresponding to the thread 0, whereby voltage generation of the power-supply system is started. If necessary, in the process of the thread 0, it is possible to activate other threads.

Here, the processor 21 temporarily accesses the flash memory 40 for initialization of the XRAM 22. However, it does not matter since the access time is a short time. When simple digital power-supply control proceeds according to the thread 0 by voltage supply from the auxiliary power source and the output voltage of the power-supply system which the MCU 1 controls is stabilized, the CPU 10 starts up a program from the flash memory 40 and starts execution of an original system process to switch power supply of the MCU 1 from the auxiliary power source to power supply from the power-supply system.

As described above, according to this modification, during system start-up of the digital power supply, it is possible to prevent an increase in power which is consumed by the auxiliary power source.

Although this disclosure has been described by the specific embodiment, it goes without saying that the above described embodiment is an example and is able to be modified and implemented without departing from the scope of this disclosure.

For example, although it has been described that the EPU 20 switches threads according to hardware context switching, thread switching may be performed by software. Also, although it has been described that the XRAM 22 is used as the work memory of the CPU 10, the work memory of the CPU 10 may be separately provided inside the MCU 1. By using the XRAM 22 as the work memory of the CPU 10, it is possible to reduce the memory cost.

As described above, in this specification, the following items are disclosed.

A disclosed microcontroller unit is a microcontroller unit for controlling a power converter, including: a first arithmetic processing unit, which performs a system process and is able to access a data bus; a second arithmetic processing unit, which includes a processor and a memory that are capable of accessing the data bus and performs a data transmitting process between peripheral circuits connected to the data bus; a first arbitration circuit, which is embedded in the second arithmetic processing unit and arbitrates access of the first arithmetic processing unit and the processor to the data bus; and a second arbitration circuit, which is embedded in the second arithmetic processing unit and arbitrates access of the second arithmetic processing unit and the processor to the memory, wherein the memory stores arithmetic processing sequences respectively in association with a plurality of event signals transmitted from the peripheral circuits connected to the data bus, and wherein, in response to input of any one of the plurality of event signals, the processor executes the arithmetic processing sequence corresponding to the event signal.

In the disclosed microcontroller unit, the first arithmetic processing unit uses the memory as a work memory.

In the disclosed microcontroller unit, the first arithmetic processing unit performs a process of initializing the arithmetic processing sequences that are stored in the memory.

In the disclosed microcontroller unit, the processor is able to be accessed from one of the first arithmetic processing unit and the processor via the first arbitration circuit and the data bus.

In the disclosed microcontroller unit, the processor is able to be accessed from the first arithmetic processing unit via the first arbitration circuit and the data bus, and an initial state of the processor is a state where reception of input of threads and the event signals is being stopped, and wherein the first arithmetic processing unit performs, at start-up, a control to cause the processor to start execution of the arithmetic processing sequence and to become an input waiting state for the event signal corresponding to the arithmetic processing sequence.

In the disclosed microcontroller unit, the second arithmetic processing unit includes a register for self activation capable of generating an event signal, and wherein one of the first arithmetic processing unit and the processor writes data in the register via the first arbitration circuit and the data bus, whereby the event signal is forcibly generated and cause the processor to start execution of the arithmetic processing sequence.

The disclosed microcontroller unit further includes a non-volatile memory, which stores the arithmetic processing sequence, wherein the processor is able to access the non-volatile memory via the data bus and, at start-up, reads the arithmetic processing sequence from the non-volatile memory, stores the read arithmetic processing sequence in the memory and then causes the processor to start execution of the arithmetic processing sequence.

In the disclosed microcontroller unit, the processor is able to be accessed from the first arithmetic processing unit via the first arbitration circuit and the data bus, wherein the second arithmetic processing unit includes the number of context holding units, which are configured by registers to hold contexts needed for execution of the arithmetic processing sequences, according to the event signals, and wherein the first arithmetic processing unit performs a process of initializing the context holding units of the processor via the first arbitration circuit and the data bus.

In the disclosed microcontroller unit, the second arithmetic processing unit includes the number of context holding units, which are configured by registers to hold contexts for execution of the arithmetic processing sequences, according to the event signals, wherein the context holding units include registers to hold condition flags, and wherein, when a designated event signal is input, the instruction includes an event state input instruction to change the value of the condition flag to be used in the arithmetic processing sequence being executed.

In the disclosed microcontroller unit, the instruction includes an event waiting instruction to stop a thread based on the arithmetic processing sequence in the process of the thread and to restart the thread when a specific event signal is input after the stop of the thread.

In the disclosed microcontroller unit, the instruction includes a timer instruction to stop a thread based on the arithmetic processing sequence in the process of the thread and to restart the thread when a predetermined time elapses from the stop of the thread.

In the disclosed microcontroller unit, the instruction includes an event output instruction to output an event output signal to the outside of the second arithmetic processing unit.

In the disclosed microcontroller unit, priorities are assigned to the arithmetic processing sequences corresponding to the event signals, and wherein, according to the priorities of the arithmetic processing sequences that are statically or dynamically defined with corresponding to input event signals and execution states of the arithmetic processing sequences, the processor preferentially executes an arithmetic processing sequence with a higher priority.

The invention claimed is:

1. A microcontroller unit for controlling a power converter, comprising:
   a first arithmetic processing unit, which performs a system process and is able to access a data bus;
   a second arithmetic processing unit, which includes a processor and a memory that are capable of accessing the data bus, and performs a data transmitting process between peripheral circuits connected to the data bus;
   a first arbitration circuit, which is embedded in the second arithmetic processing unit and arbitrates access of the first arithmetic processing unit and the processor to the data bus; and
   a second arbitration circuit, which is embedded in the second arithmetic processing unit and arbitrates access of the first arithmetic processing unit and the processor to the memory,
   wherein the memory stores arithmetic processing sequences respectively in association with a plurality of event signals transmitted from the peripheral circuits connected to the data bus, the arithmetic processing sequences including an instruction,
   wherein, in response to input of any one of the plurality of event signals, the processor executes a corresponding arithmetic processing sequence,
   wherein the first arithmetic processing unit accesses the memory via the first arbitration circuit and the second arbitration circuit,
   wherein the processor accesses the memory via the second arbitration circuit without using the first arbitration circuit,
   wherein the plurality of event signals is generated in the peripheral circuits included in the microcontroller unit and input to the processor,
   wherein the second arithmetic processing unit includes a plurality of context holding units to hold respectively a plurality of contexts, each of the plurality of context holding units including a plurality of registers and one program counter, and configurations of the plurality of context holding units including programmer's models, and
   wherein each of the plurality of contexts is information including a value necessary for execution of an arithmetic processing sequence according to one of the plurality of event signals from the peripheral circuits.

2. The microcontroller unit according to claim 1, wherein the first arithmetic processing unit uses the memory as a work memory.

3. The microcontroller unit according to claim 2, wherein the first arithmetic processing unit performs a process of initializing the arithmetic processing sequences that are stored in the memory.

4. The microcontroller unit according to claim 1,
   wherein the processor is able to be accessed from the first arithmetic processing unit via the first arbitration circuit and the data bus, and an initial state of the processor is a state where reception of input of threads and the event signals are being stopped, and
   wherein the first arithmetic processing unit performs, at its start-up, a control to cause the processor to start execution of the arithmetic processing sequence and to enter an input waiting state for the event signal corresponding to the arithmetic processing sequence.

5. The microcontroller unit according to claim 1,
   wherein the second arithmetic processing unit includes a register for self activation capable of generating an event signal, and
   wherein one of the first arithmetic processing unit and the processor writes data in the register via the first arbitration circuit and the data bus, and the event signal is forcibly generated by the register and causes the processor to start execution of the arithmetic processing sequence.

6. The microcontroller unit according to claim 5, further comprising:
   a non-volatile memory, which stores the arithmetic processing sequence,
   wherein the processor is able to access the non-volatile memory via the data bus and, at start-up, reads the arithmetic processing sequence from the non-volatile memory, stores the read arithmetic processing sequence in the memory and then causes the processor to start execution of the arithmetic processing sequence.

7. The microcontroller unit according to claim 1,
   wherein the processor is able to be accessed from the first arithmetic processing unit via the first arbitration circuit and the data bus, and
   wherein the first arithmetic processing unit performs a process of initializing the context holding units of the processor via the first arbitration circuit and the data bus.

8. The microcontroller unit according to claim 1,
   wherein, when a designated event signal is input, the instruction includes an event state input instruction to change a value of a condition flag to be used in the arithmetic processing sequence being executed.

9. The microcontroller unit according to claim 1, wherein the instruction includes an event waiting instruction to stop a thread based on the arithmetic processing sequence in a process of the thread and to restart the thread when a specific event signal is input after the stop of the thread.

10. The microcontroller unit according to claim 1, wherein the instruction includes a timer instruction to stop a thread based on the arithmetic processing sequence in the process of the thread and to restart the thread when a predetermined time elapses from the stop of the thread.

11. The microcontroller unit according to claim 1, wherein the instruction includes an event output instruction to output an event output signal to the outside of the second arithmetic processing unit.

12. The microcontroller unit according to claim 1,
   wherein priorities are assigned to the arithmetic processing sequences corresponding to the event signals, and
   wherein, according to the priorities of the arithmetic processing sequences that are statically or dynamically defined with corresponding input event signals and execution states of the arithmetic processing sequences, the processor preferentially executes an arithmetic processing sequence with a higher priority.

13. The microcontroller unit according to claim 1,
   wherein when one event signal of the plurality of the event signals is input to the second arithmetic processing unit, one thread corresponding to the one event signal is started, and one context of the plurality of contexts corresponding to the one thread are held in one context holding unit of the plurality of context holding units, and
   wherein when another event signal of the plurality of the event signals is input to the second arithmetic processing unit, another thread corresponding to the another event signal is started, and another context of the plurality of contexts corresponding to the another thread is held in another context holding unit of the plurality of context holding units.

14. A microcontroller unit for controlling a power converter, comprising:
- a first arithmetic processing unit, which performs a system process and is able to access a data bus;
- a second arithmetic processing unit, which includes a processor and a memory that are capable of accessing the data bus, and performs a data transmitting process between peripheral circuits connected to the data bus;
- a first arbitration circuit, which is embedded in the second arithmetic processing unit and arbitrates access of the first arithmetic processing unit and the processor to the data bus; and
- a second arbitration circuit, which is embedded in the second arithmetic processing unit and arbitrates access of the first arithmetic processing unit and the processor to the memory,
- wherein the memory stores arithmetic processing sequences respectively in association with a plurality of event signals transmitted from the peripheral circuits connected to the data bus, the arithmetic processing sequences including an instruction,
- wherein, in response to input of any one of the plurality of event signals, the processor executes a corresponding arithmetic processing sequence,
- wherein the first arithmetic processing unit accesses the memory via the first arbitration circuit and the second arbitration circuit,
- wherein the processor accesses the memory via the second arbitration circuit without using the first arbitration circuit,
- wherein the plurality of event signals is generated in the peripheral circuits included in the microcontroller unit and input to the processor,
- wherein the second arithmetic processing unit includes a plurality of context holding units to hold respectively a plurality of contexts, each of the plurality of context holding units including a plurality of registers and one program counter, and
- wherein each of the plurality of contexts is information including a value of the program counter, the information being necessary for execution of an arithmetic processing sequence according to one of the plurality of event signals from the peripheral circuits.

* * * * *